United States Patent [19]
Haug

[11] 3,862,227
[45] Jan. 21, 1975

[54] NEW DIAMINES

[75] Inventor: Theobald Haug, Frenkendorf, Switzerland

[73] Assignee: Ciba-Geigy Corporation, Ardsley, N.Y.

[22] Filed: June 15, 1972

[21] Appl. No.: 263,020

[30] Foreign Application Priority Data
July 1, 1971  Switzerland.................... 9685/71

[52] U.S. Cl.. 260/563 R, 260/77.5 NC, 260/483 K, 260/464, 260/465 F, 260/465.6, 260/30.4 LP, 260/257, 106/169, 106/271, 262/2 N, 262/47 EQ, 260/47 EN, 260/59, 260/584 C, 260/78.4 EP

[51] Int. Cl............................................ C07c 93/04

[58] Field of Search......... 260/563 R, 563 C, 584 C

[56] References Cited
UNITED STATES PATENTS

| | | | |
|---|---|---|---|
| 2,363,464 | 11/1944 | Senkus............................ | 260/584 C |
| 2,941,967 | 6/1960 | Moller et al..................... | 260/563 C |
| 3,267,122 | 8/1966 | Lehmann et al................ | 260/584 C |
| 3,658,902 | 4/1972 | Bordenca........................ | 260/563 R |

*Primary Examiner*—Lewis Gotts
*Assistant Examiner*—D. R. Phillips

[57] ABSTRACT

New diamines in which at least one $NH_2$— group is bonded to a secondary aliphatic C atom are manufactured by hydrogenating compounds which contain at least one oxo group in the molecule and correspond to the following formula

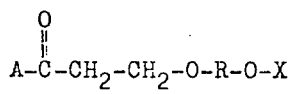

wherein A denotes a lower alkyl group with one to six carbon atoms, R denotes a divalent, linear or branched aliphatic, cycloaliphatic, cycloaliphatic-aliphatic, araliphatic or heterocyclic-aliphatic hydrocarbon radical which is optionally interrupted by ether oxygen atoms and X denotes a radical of the formulae

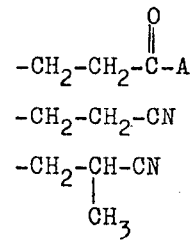

in the presence of ammonia and a suitable hydrogenation catalyst, under pressure.

6 Claims, No Drawings

NEW DIAMINES

The new diamines are valuable curing agents for epoxide resins. The coverings and coatings manufactured based on epoxide resins and such aliphatic polyamines are free of surface flaws and above all transparent coatings are obtained.

The subject of the present invention are new diamines of the formula $$A-\underset{\underset{NH_2}{|}}{CH}-CH_2-CH_2-O-R-O-Z \qquad (I)$$

wherein A denotes a lower alkyl group with one to six carbon atoms, R denotes a divalent, linear or branched aliphatic, cycloaliphatic, cycloaliphatic-aliphatic, araliphatic or heterocyclic-aliphatic hydrocarbon radical which is optionally interrupted by ether oxygen atoms and Z denotes a radical of the formulae $$-CH_2-CH_2-\underset{\underset{NH_2}{|}}{CH}-A$$
$$-CH_2-CH_2-CH_2-NH_2$$
$$-CH_2-\underset{\underset{CH_3}{|}}{CH}-CH_2-NH_2$$

Preferably, in the formula (I) A denotes a methyl radical, R denotes a divalent aliphatic hydrocarbon radical with two to 12 carbon atoms or a divalent cycloaliphaticaliphatic hydrocarbon radical and Z denotes a 3-aminopropyl or a 3-aminobutyl radical.

According to the invention, the new diamines of the formula (I) are manufactured by hydrogenating compounds which possess at least one oxo group in the molecule and correspond to the following formula $$A-\underset{\underset{O}{\|}}{C}-CH_2-CH_2-O-R-O-X \qquad (II)$$

wherein A and R have the same meaning as in the formula (I) and X denotes a radical of the formulae $$-CH_2-CH_2-\underset{\underset{O}{\|}}{C}-A$$
$$-CH_2-CH_2-CN$$
$$-CH_2-\underset{\underset{CH_3}{|}}{CH}-CN$$

in the presence of ammonia and a suitable hydrogenation catalyst, under pressure.

Particularly effective hydrogenation catalysts are Raney nickel or Raney cobalt. It is also possible to use a cobalt oxide catalyst on a suitable carrier, which is reduced to cobalt metal catalyst in a stream of hydrogen.

Possible hydrogenation catalysts are furthermore catalysts based on platinum and palladium which can be employed as platinum black or palladium black, as colloidal platinum or palladium, or as platinum or palladium oxide or hydroxide catalysts. Possible carriers for such catalysts are the customary materials, such as asbestos, pumice, kieselguhr, silica gel, silicic acid, active charcoal and the sulphates, carbonates or oxides of the metals of group II to VIII of the periodic system, especially of magnesium, calcium, barium, zinc, aluminium, iron, chromium and zirconium.

The hydrogenation can be carried out in accordance with the methods customary in the laboratory and in industry, under pressure in an autoclave. As solvents it is possible to use the organic solvents usually employed in hydrogenation together with the abovementioned types of catalyst, and in particular preferably lower aliphatic alcohols, such as methanol or ethanol. The hydrogenation is advantageously carried out in the presence of ammonium chloride.

The catalytic reduction is as a rule carried out by dissolving the starting compound in an organic solvent and ammonia, mixing the solution with the catalysts and passing hydrogen gas under pressure into the reaction mixture. The hydrogenation can in principle be carried out at room temperature but elevated reaction temperatures in the range of 40° to 150°C, at a pressure of about 5 to 200 atmospheres hydrogen, are preferred. The hydrogenation is continued until no further hydrogen is absorbed. After completion of the hydrogenation the catalyst is separated off, for example by filtration, and the solvent is distilled off.

The compounds of the formula (II) used as starting substances, which contain at least one oxo group, are manufactured according to various processes.

The compounds of the formula (II) which contain two oxo groups in the molecule are obtained by acid-catalysed addition of 2 mols of an alkyl vinyl ketone or cycloalkyl vinyl ketone of the formula $$A-\underset{\underset{O}{\|}}{C}-CH=CH_2 \qquad (III)$$

wherein A has the same meaning as in the formula (I), to 1 mol of a diol of the formula $$HO-R-OH \qquad (IV)$$

wherein R has the same meaning as in the formula (I).

Preferably, methyl vinyl ketone is used as the alkyl vinyl ketone in this process.

The compounds of the formula (II) which contain both an oxo group and a nitrile group in the molecule are manufactured according to a 2-stage process in which, for example, in a first stage 1 mol of acrylonitrile or methacrylonitrile is added onto 1 mol of a diol of the formula (IV) in a known manner and then, in a second stage, 1 mol of an alkyl vinyl ketone or cycloalkyl vinyl ketone of the formula (III) is added catalytically, in a known manner, onto 1 mol of the addition product obtained in the first stage. It is of course also possible to allow this 2-stage addition reaction to take place in a different sequence, that is to say first to add 1 mol of alkyl vinyl ketone or cycloalkyl vinyl ketone of the formula (III) onto 1 mol of a diol of the formula (IV) and subsequently to add 1 mol of acrylonitrile or methacrylonitrile onto the addition product thus obtained.

As examples of suitable alkyl vinyl ketones or cycloalkyl vinyl ketones of the formula (III) there may be mentioned: methyl vinyl ketone, ethyl vinyl ketone, n-propyl and isopropyl vinyl ketone, butyl vinyl ketone and cyclohexyl vinyl ketone.

Possible polyalcohols of the formula (IV) are above all those of the aliphatic, cycloaliphatic and heterocyclicaliphatic series.

As diols of the aliphatic series there may be mentioned: ethylene glycol, 1,2-propanediol, 1,3- propanediol, 1-4-butanediol, 1,5-pentanediol, neopentyl glycol, 1,6-hexanediol, 1,7-heptanediol, 1,8-octanediol, 1,9-nonanediol, 1,10-decanediol, 1,11-undecanediol, 1,12-dodecanediol, 1,6-dihydroxy-2,2,4-trimethyl-hexane, 1,6-dihydroxy-2,4,4-trimethyl-hexane, 1,4-butenediol; polyether glycols, such as diethylene glycol, triethylene glycol, tetraethylene glycol, dipropylene glycol, polyethylene glycols and polypropylene glycols of average molecular weight 250 to 2,500, polybutylene glycols and polyhexanediols.

As diols of the cycloaliphatic series there may be mentioned: 1,1-, 1,2-, 1,3- and 1,4-bis(hydroxymethyl)cyclohexane and the corresponding unsaturated cyclohexene derivatives such as, for example, 1,1-bis-(hydroxymethyl)-cyclohexene-3 and 1,1-bis-(hydroxymethyl)-2,5-methylene-cyclohexene-3; hydrogenated diphenols such as cis-quinitol, transquinitol, resorcitol, 1,2-dihydroxy-cyclohexane, bis-(4-hydroxy-cyclohexyl)-methane, 2,2-bis-(4'-hydroxycyclohexyl)-propane; tricyclo-(5,2,1,0$^{2,6}$)-decane-3,9- or -4,8-diol, and adducts of glycols to diallylidene-pentaerythritol, for example 3,9-bis-(hydroxyethoxyethyl)-spirobi-(methadioxane).

Possible diols of the heterocyclic-aliphatic series are especially the addition products of at least 2 mols of an alkene oxide, such as ethylene oxide, propene oxide, 1,2-butene oxide or styrene oxide, to 1 mol of a mononuclear or polynuclear N-heterocyclic compound with two ring—NH— groups, such as, above all, hydantoin and its derivatives, dihydrouracil and its derivatives, barbituric acid and its derivatives bis-hydantoins and bis-dihydrouracils. The following may be mentioned: 1,3-di-(β-hydroxyethyl)-5,5-dimethylhydantoin, 1,3-di-(β-hydroxyethyl)-5-phenyl-5-ethylbarbituric acid, 1,3-di-(β-hydroxy-n-propyl)-5,5-dimethylhydantoin, 1,3-di-(β-hydroxy-n-propyl)-5,5-diethylbarbituric acid, 1,3-di-(β-hydroxyethoxyethoxyethyl)-5,5-dimethylhydantoin, 1,3-di-(β-hydroxy-n-propyl)-5-isopropylhydantoin, 1,-3-di-(β-hydroxy-n-butyl)-5,5-dimethylhydantoin, 1,3-di-(β-hydroxy-β-phenylethyl)-5,5-dimethylhydantoin, 1,3-di-(β-hydroxy-β-phenylethyl)-6-methyluracil, 1,1'-methylene-bis-(3-β-hydroxyethyl-5,5-dimethylhydantoin), 1,1'-methylene-bis-(3-β-hydroxyethoxyethoxyethyl-5,5-dimethylhydantoin), 1,1'-methylene-bis-(3-β-hydroxy-n-propyl-5,5-dimethylhydantoin), 1,1'-methylene-bis-(3-β-hydroxyethyl-5,5-dimethyl-5,6-dihydrouracil), 1,4-bis-(1'-β'-hydroxyethyl-5',5'-dimethylhydantoinyl-3')-butane, 1,6-bis-(1'-[2''-hydroxy-n-butyl]-5',5'-dimethylhydantoinyl-3')-hexane and β,β'-bis-(1-[2'-hydroxy-n-butyl]-5,5-dimethylhydantoinyl-3)-diethylether.

The new diamines of the formula (I) are valuable curing agents for epoxide resins.

It is known that epoxide resins can be cured by aliphatic polyamines. Curing with these polyamines, such as diethylenetriamine, triethylenetetramine or hexamethylenediamine leads, even at room temperature, to products with good mechanical properties which however do not always satisfy the highest requirements. Thus the epoxide resins cured using such polyamines are relatively brittle and tend to crack formation under mechanical stress. Furthermore, the coatings and coverings manufactured based on epoxide resins and such aliphatic polyamines are not free of surface flaws and only cloudy lacquers, which suffer from an objectionable haziness for many end uses, are obtained.

It has now been found that these disadvantages can be overcome and that, above all, transparent coatings are obtained if instead of the known aliphatic polyamines the new diamines of the formula (I), in which at least one NH$_2$— group is bonded to a secondary aliphatic carbon atom, are used as curing agents for epoxide resins.

A further subject of the present invention are thus curable mixtures which are suitable for the manufacture of mouldings, impregnations, coatings and adhesive bonds and which are characterised in that they contain a. a polyepoxide compound with an average of more than one epoxide group in the molecule and b. as curing agents, the new diamines of the formula

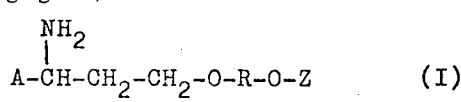

wherein A denotes a lower alkyl group with one to six carbon atoms, R denotes a divalent, linear or branched aliphatic, cycloaliphatic, cycloaliphatic-aliphatic, araliphatic or heterocyclic-aliphatic hydrocarbon radical which is optionally interrupted by ether oxygen atoms and Z denotes a radical of the formulae

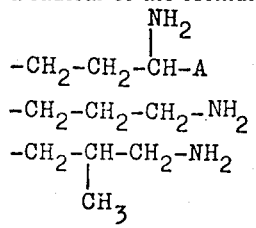

Preferably, those compounds of the formula (I) are used wherein A denotes a methyl radical, R denotes a divalent aliphatic hydrocarbon radical with two to 12 carbon atoms or a divalent cycloaliphatic-aliphatic hydrocarbon radical and Z denotes a 3-aminopropyl or a 3-aminobutyl radical.

Appropriately, 0.5 to 1.3 equivalents, preferably approx. 1.0 equivalent, of nitrogen-bonded active hydrogen atoms of the diamine of the formula (I) are used per 1 equivalent of epoxide groups of the polyepoxide compound (a).

Possible polyepoxide compounds (a) are above all those with an average of more than one glycidyl group, β-methylglycidyl group or 2,3-epoxycyclopentyl group bonded to a hetero-atom (for example sulphur, preferably oxygen or nitrogen); in particular there may be mentioned bis-(2,3-epoxycyclopentyl)-ether; di- or polyglycidyl-ethers of polyhydric aliphatic alcohols, such as 1,4-butanediol, or polyalkylene glycols, such as polypropylene glycols; di- or polyglycidyl-ethers of cycloaliphatic polyols, such as 2,2-bis-(4-hydroxycyclohexyl)propane; di- or polyglycidyl-ethers of polyhydric phenols, such as resorcinol, bis-(p-hydroxyphenyl)methane, 2,2-bis(p-hydroxyphenyl)-propane (= diomethane), 2,2-bis(4'-hydroxy-3',5'-dibromophenyl)propane, 1,1,2,2-tetrakis-(p-hydroxylphenyl)ethane, or condensation products of phenols with formaldehyde obtained under acid conditions, such as phenol-novolacs or cresol-novolacs; di- or poly-(β-methylglycidyl)ethers of the abovementioned polyhydric alcohols or polyhydric phenols; polyglycidyl esters of polybasic carboxylic acids, such as phthalic acid, terephthalic acid, Δ⁴-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine, N,N,N',N'-tetraglycidyl-bis-(p-aminophenyl)-methane; triglycidyl isocyanurate, N,N'-diglycidyl-5,5-diemthyl-hydantoin, N,N'-diglycidyl-5-isopropylhydantoin; N,N'-diglycidyl-5,5-dimethyl-6-isopropyl-5,6-dihydrouracil.

If desired, active diluents, such as, for example, styrene oxide, butyl-glycidyl-ether, isooctyl-glycidyl-ether, phenyl-glycidyl-ether, cresyl-glycidyl-ether, and glycidyl esters of synthetic, highly branched, or mainly tertiary aliphatic monocarboxylic acids ("CARDURA E") can be added to the polyepoxides in order to reduce the viscosity.

The curing of the curable mixtures according to the invention to give mouldings and the like is appropriately carried out in the temperature range of 20° to 150°C. The curing can, in a known manner, also be carried out in two or more stages, with the first curing stage being carried out, for example, at room temperature, and the post-curing at a higher temperature.

The curing can, if desired, also be carried out in two stages by first prematurely stopping the curing reaction or carrying out the first stage at room temperature or only slightly elevated temperature, whereby a curable pre-condensate which is still fusible and soluble (a so-called "B-stage") is obtained from the epoxide component (a) and the amine curing agent (b). Such a pre-condensate can serve, for example, for the manufacture of "prepregs," compression moulding compositions or especially sintering powders.

In order to reduce the gelling or curing times, known accelerators for the amine curing reaction, for example monophenols or polyphenols, such as phenol or diomethane, salicyclic acid, tertiary amines or salts of thiocyanic acid, such as NH₄SCN, can be added.

The term "curing" as used here denotes the conversion of the soluble, either liquid or fusible, polyepoxides into solid, insoluble and infusible, three-dimensionally cross-linked products or materials, as a rule with simultaneous shaping to give mouldings, such as castings, pressings, laminates and the like or to give "sheet-like structures" such as coatings, lacquer films of adhesive bonds.

The curable mixtures, according to the invention, of polyepoxide compounds (a) and the diamines of the formula I as the curing agent (b) can furthermore be mixed, in any stage before curing, with customary modifiers, such as extenders, fillers and reinforcing agents, pigments, dyestuffs, organic solvents, plasticisers, flow control agents, flameproofing substances and mould release agents.

As extenders, reinforcing agents, fillers and pigments which can be employed in the curable mixtures according to the invention there may, for example, be mentioned: coal tar, bitumen, textile fibres, glass fibres, asbestos fibres, boron fibres, carbon fibres, cellulose, polyethylene powder and polypropylene powder; quartz powder, mineral silicates, such as mica, asbestos powder and slate powder; kaolin, aluminium oxide trihydrate, chalk powder, gypsum, antimony trioxide, bentones, silica aerogel ("AEROSIL"), lithophone, baryte, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

As plasticisers for modifying the curable mixtures, dibutyl phthalate, dioctyl phthalate and dinonyl phthalate, tricresyl phosphate, trixylenyl phosphate and also polypropylene glycol can, for example, be employed.

As flow control agents when employing the curable mixtures, especially in surface protection, silicones, cellulose acetobutyrate, polyvinylbutyral, waxes, stearates and the like (which in part are also used as mould release agents) may, for example, be added.

Particularly for use in the lacquer field, the polyepoxide compounds can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner, with the aid of known mixing equipment (stirrers, kneaders, mills and the like).

The curable epoxide resin mixtures according to the invention are above all employed in the fields of surface protection, the electrical industry, laminating processes and the building industry. They can be used in a formulation suite in each case to the special end use, in the unfilled or filled state, optionally in the form of solutions or emulsions, as paints, lacquers, sintering powders, compression moulding compositions, injection moulding formulations, dipping resins, casting resins, impregnating resins, binders and adhesives, tool resins, laminating resins, sealing and filling compositions floor covering compositions and binders for mineral aggregates.

In the examples which follow, unless otherwise stated, parts denote parts by weight and percentages denote percentages by weight. The relationship of parts by volume to parts by weight is as of the millilitre to the gram.

EXAMPLE 1

80.0 g of 1-(3-oxobutoxy)-4-(2-cyanoethoxy)-butane in 200 ml of 95 percent strength ethanol are hydrogenated for 5 hours at 175 atmospheres initial pressure and 90°C in the presence of 50 g of ammonia and 8 g of a hydrogenation catalyst commerically obtainable under the tradename "Hydrogenation Catalyst G-49 B." After filtering off the catalyst, the alcohol is very largely distilled off and the liquid residue is subjected to a fractional distillation, whereupon 1-(3-aminobutoxy)-4-(3-aminopropoxy)-butane distils at 95°–99°C/0.04 mm Hg. The amine content is 98 percent of theory. The elementary analysis, H-NMR (nuclear magnetic resonance), IR (infra-red) and mass spectrum agree with the assumed structure. Accordingly, the diamine obtained has the formula

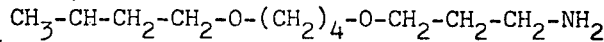

EXAMPLE 2

10.0 g (0.0495 mol) of 1,2-di-(3-oxobutoxy)-ethane are dissolved in 200 ml of absolute ethanol saturated with ammonia and hydrogenated for 3 hours at 45°C and an initial pressure of 5 atmospheres, in the presence of 1 g of platinum oxide as the hydrogenation catalyst. The hydrogen absorption is 2,280 ml (0.104 mol). After filtering off the catalyst, the ethanol is very largely distilled off. 9.6 g of 1,2-di-(3-aminobutoxy)-ethane are left in the form of a clear, colourless liquid. The amine content is 92.3 percent of theory. The elementary analysis, H—NMR, IR and mass spectrum agree with the assumed structure. Accordingly, the diamine obtained has the formula

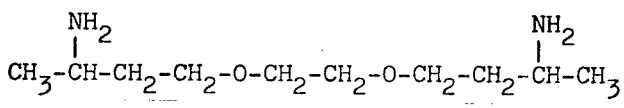

EXAMPLE 3

20.0 g of 1,4-di-(3-oxobutoxymethyl)-cyclohexane are dissolved in 200 ml of absolute ethanol and hydrogenated for 3 hours at 70°–73°C and at an initial pressure of 75 atmospheres of hydrogen, in the presence of 20 g of ammonia and 2 g of Raney nickel as the hydrogenation catalyst. After filtering off the catalyst, the alcohol is very largely distilled off and the residual clear liquid is fractionally distilled. Hereupon, 14.4 g of 1,4-di-(3-aminobutoxymethyl)-cyclohexane distil as the main fraction at 137°–41°C/0.4 mm Hg. The elementary analysis, N—NMR, IR and mass spectrum agree with the assumed structure. Accordingly, the diamine obtained has the formula

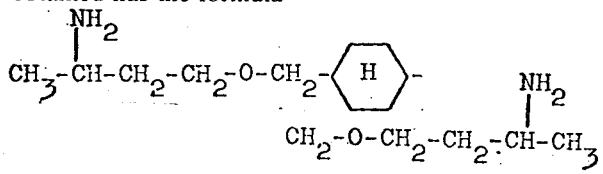

EXAMPLE 4

8.1 g (0.031 mol) of 1,6-di-(3-oxobutoxy)-hexane, contaminated with a little 1-(3-oxobutoxy)-hexanol-6, in 200 ml of ethanol are hydrogenated for 3.5 hours at 50°C and a maximum of 5 atmospheres hydrogen pressure, in the presence of 15 g of ammonia, 0.35 g of ammonium chloride and 0.8 g of platinum oxide. Thereafter the catalyst is filtered off and the solvent is largely distilled off. 8.4 g of a clear, colourless oil remain, containing, according to a gas chromatogram, 84 percent of theory of 1,6-di-(3-aminobutoxy)-hexane. The amine is purified by distillation, its boiling point being 126°–128°C at 0.2 mm Hg. The elementary analysis and H—NMR, IR and mass spectrum agree with the assumed structure. Accordingly, the amine obtained has the formula:

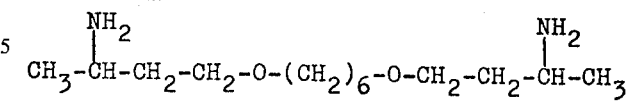

EXAMPLE 5

10.0 g (0.043 mol) of 1,4-di-(oxobutoxy)-butane in 200 ml of absolute ethanol are hydrogenated for 3 hours at 50°C and a maximum of 5 atmospheres hydrogen pressure, in the presence of 10 g of ammonia, 0.4 g of ammonium chloride and 1 g of platinum oxide. Thereafter the catalyst is filtered off and the solvent is largely distilled off. 9.3 g of a clear yellowish oil remain, which according to a gas chromatogram contain 61 percent of theory of 1,4-di-(3-aminobutoxy)-butane. The amine is purified by distillation, its boiling point being 160°–163°C at 9 mm Hg. The elementary analysis and H—NMR, IR and mass spectrum agree with the assumed structure. Accordingly the amine obtained has the formula:

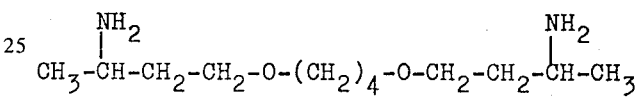

Use examples:

EXAMPLE I

A solution of 5.5 g of the 1-(3-aminobutoxy)-4-(3-aminopropoxy)-butane manufactured according to Example 1 (amine A) in 7.2 g of n-butanol and 7.3 g of xylene is prepared (amine solution A). Equally, a solution of 2.1 g of diethylenetriamine (amine B) in 8.9 g of n-butanol and 9.0 g of xylene is prepared (amine solution B). Additionally, a solution is prepared from 48.0 g of 2,2-bis-(4-hydroxyphenyl)-propane-diglycidyl-ether (epoxide content: 2.14 epoxide equivalents/kg) in 10 g of methyl isobutyl ketone, 9 g of ethylene glycol, 10 g of xylene and 3 g of a levelling agent obtainable under the tradename "Cibamin H 53" (solution C).

The amine solutions A and B are each separately mixed with the epoxide solution C to give a lacquer solution, in such a way that the ratio of the amino groups to the epoxide groups is 1:2. These lacquer solutions are applied to previously cleaned aluminium sheets and cured under the conditions indicated in Table 1, and the properties of the cured lacquers are subsequently determined and compared with one another.

Table 1

Properties of the lacquers manufactured from the two amines A and B and the diglycidyl-ether.

| Amine solution used | A | B |
| --- | --- | --- |
| Pot life of the lacquer solution | 2.5 days | 1.5 days |
| At 20°C/65% relative humidity the lacquer is dust-dry after | 4 hours | 5 hours |
| Transparency of the lacquer film | good (clear) | poor (cloudy) |
| Persoz pendulum hardness after curing at 20°C, after | | |
| 1 day | 56 | 80 |
| 3 days | 130 | 165 |
| 7 days | 190 | 220 |
| Persoz pendulum hardness after curing | | |
| at 60°C for 60 minutes | 135 | 150 |
| at 120°C for 20 minutes | 320 | 325 |
| Erichsen extensibility after curing | | |
| at 20° for 7 days | 8.9 mm | 8.6 mm |
| at 20° for 60 minutes | 0.6 mm | 0.8 mm |
| at 120° for 20 minutes | 9.5 mm | 9.7 mm |
| The water resistance is, after curing | | |
| at 60° for 60' | film is hard | film is hard |
| at 120° for 20' | film is hard | film is hard |

The comparison shows that a lacquer based on the amine A has a higher pot life, a shorter dust-dry time, the same extensibility, the same hardness after curing at 120°C and the same water resistance as a lacquer based on amine B. The pendulum hardness of the epoxide resin lacquer cured with amine A at room temperature is only slightly lower than that of the lacquer cured with amine B. Against this, the lacquer manufactured with the new amine is completely clear and shows no haziness.

EXAMPLE II 4 amine solutions are prepared:

A. from 5.5 g of the 1-(3-aminobutoxy)-4-(3-aminopropoxy)-butane manufactured according to Example 1, in 7.2 g of n-butanol and 7.3 g of xylene.

B. from 8.0 g of the 1,4-di-(3-aminobutoxymethyl)-cyclohexane manufactured according to Example 3, in 6.0 g of n-butanol and 6.0 of xylene.

C. from 5.8 g of the 1,4-di-(3-aminobutoxy)-butane manufactured according to Example 5, in 7.1 g of n-butanol and 7.1 g of xylene.

D. from 2.1 g of diethylenetriamine in 8.9 g of n-butanol and 9.0 g of xylene.

Epoxide resin solution

Additionally, a solution is manufactured from 48.0 g of 2,2-bis-(4-hydroxyphenyl)-propane-diglycidyl-ether (epoxide content: 2.14 epoxide equivalents/kg) in 10 g of methyl isobutyl ketone, 9 g of ethylene glycol, 10 g of xylene and 3 g of a commerically available flow control agent based on ureaformaldehyde resin (solution E).

The amine solutions A, B, C and D are each separately mixed with the epoxide resin solution E to give a lacquer solution, in such a way that the ratio of the amino groups to the epoxide groups is 1:2. These lacquer solutions are applied to previously cleaned aluminium sheets and cured under the conditions indicated in Table 2 below, and thereafter the properties of the cured lacquers are determined and compared with one another.

pendulum hardness of the epoxide resin lacquer cured with amine A at room temperature is only slightly less than that of the lacquer cured with amine D. On the other hand, the lacquers based on the amines B and C reach a sufficiently high pendulum hardness substantially more rapidly at room temperature. Above all, however, the lacquers manufactured with the amines according to the invention are completely clear and show no haziness, such as manifests itself distinctly in the case of the lacquer manufactured using amine D.

I claim:

1. A diamine of the formula

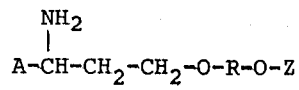

wherein A is a lower alkyl group with one to six carbon atoms, R is a linear or branched alkylene group having two to 12 carbon atoms or the group

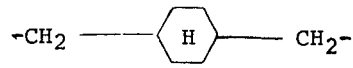

and Z is a member selected from the group consisting of a radical of formulae

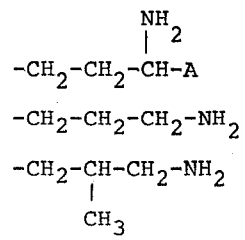

wherein A has the same meaning as above.

2. A diamine as claimed in claim 1 which is 1,2-di-(3-aminobutoxy)-ethane.

3. A diamine as claimed in claim 1 which is 1,4-di-(3-aminobutoxymethyl)-cyclohexane.

4. A diamine as claimed in claim 1 which is 1,6-di-(3-aminobutoxy)-hexane.

Table 2

Properties of lacquers manufactured from amines A, B, C and D and the diglycidyl ether.

| Amine solution used | A | B | C | D |
|---|---|---|---|---|
| Pot life of the lacquer solution | 2.5 days | 2 days | 2 days | 1.5 days |
| At 20°C/65% relative humidity the lacquer is dust-dry after | 4 hours | 4.5 hours | 5 hours | 5 hours |
| Transparency of the lacquer film | good (clear) | good (clear) | good (clear) | poor (cloudy) |
| Persoz pendulum hardness after curing at 20°C, after | | | | |
| 1 day | 56 | 80 | 75 | 80 |
| 3 days | 130 | 220 | 200 | 165 |
| 7 days | 190 | 280 | 270 | 220 |
| Persoz pendulum hardness after curing | | | | |
| at 60°C for 60 minutes | 135 | 280 | 250 | 150 |
| at 120°C for 20 minutes | 320 | 365 | 330 | 325 |
| Erichsen extensibility after curing | | | | |
| at 20°C for 7 days | 8.9 mm | 1.8 mm | 3.5 mm | 8.6 mm |
| at 20°C for 60 minutes | 0.6 mm | 0.5 mm | 0.5 mm | 0.8 mm |
| at 120°C for 20 minutes | 9.5 mm | 10.0 mm | 9.7 | 9.7 mm |
| The water resistance is, after curing | | | | |
| at 60° for 60' | film is hard | film is hard | film is hard | film is hard |
| at 120° for 20' | film is hard | film is hard | film is hard | film is hard |

The comparison shows that a lacquer based on the amines A, B, and C has, on average, a somewhat higher pot life, the same extensibility but, on average, a higher pendulum hardness after curing at 120°C, and the same water resistance, as a lacquer based on amine D. The 5. A diamine as claimed in claim 1 which is 1,4-di-(3-aminobutoxy)-butane.

6. A diamine as claimed in claim 1 which is 1-(3-aminobutoxy)-4-(3-aminopropoxy)-butane.

* * * * *